United States Patent [19]
Senechalle et al.

[11] Patent Number: 5,142,142
[45] Date of Patent: Aug. 25, 1992

[54] PORTABLE DEVICE FOR DETECTING SHORT DURATION ENERGY PULSES

[75] Inventors: David A. Senechalle; Robert Mays, Jr., both of Austin; Clarence W. Fowler, Elgin, all of Tex.; Sheldon M. Rutter, Washington, D.C.

[73] Assignee: Trator Inc.

[21] Appl. No.: 407,568

[22] Filed: Sep. 15, 1989

[51] Int. Cl.⁵ .......................... H01J 5/16; H01J 40/14; H03K 5/22
[52] U.S. Cl. .................. 250/227.23; 250/214 B; 250/561; 307/311; 328/111; 328/112; 328/114
[58] Field of Search ....... 250/214 B, 214 A, 214 AG, 250/551, 203.1, 203.2, 203.3, 227.23, 214 R, 561; 372/6; 273/310–316; 434/16, 17, 19, 20–22; 356/152, 141; 307/311; 328/108, 111, 112, 114

[56] References Cited

U.S. PATENT DOCUMENTS

| | | | |
|---|---|---|---|
| 2,489,297 | 11/1949 | Labin et al. | 328/108 |
| 3,867,628 | 2/1975 | Brown | 250/214 R |
| 3,992,099 | 11/1976 | Laughlin | 356/73 |
| 4,102,059 | 7/1978 | Kimble et al. | 273/310 |
| 4,236,069 | 11/1980 | Laughlin | 250/214 |
| 4,263,508 | 4/1981 | Leary et al. | 250/358.1 |
| 4,276,472 | 6/1981 | Costantino et al. | 250/214 B |
| 4,366,378 | 12/1982 | Simons | 250/214 B |
| 4,678,437 | 7/1987 | Scott et al. | 434/21 |
| 4,724,312 | 2/1988 | Snaper | 250/214 B |
| 4,748,318 | 5/1988 | Bearden et al. | 235/472 |
| 4,778,990 | 10/1988 | Laughlin | 250/227 |
| 4,792,675 | 12/1988 | Laughlin | 250/227 |
| 4,835,381 | 5/1989 | Sorensen | 250/227 |

Primary Examiner—Stephen C. Buczinski

[57] ABSTRACT

A portable laser detection device is disclosed. Optical pulses are sensed by a photodiode and if the pulse width is less than a predetermined value a laser occurred indicator will flash until reset by the user. A laser present indicator will flash and an intermittent audible tone will be generated as long as laser energy having certain characteristics is present. A delay circuit ensures error free detection if a pulse having a width greater than the predetermined value is received immediately after a pulse having a width less than the predetermined value is received. Further, a high energy pulse with a sufficiently fast rise time received by the detector will cause the laser occurred indicator to flash, the laser present indicator to be illuminated continuously, and an audible tone to be generated. The device is shielded against electromagnetic interference and adapts automatically to variations in background noise.

12 Claims, 8 Drawing Sheets

PORTABLE DEVICE FOR DETECTING SHORT DURATION ENERGY PULSES

BACKGROUND OF THE INVENTION

1. Field of the Invention

The present invention relates generally to an apparatus for detecting incident radiant energy, and more particularly relates to a portable apparatus for detecting the presence of pulsed-laser energy in various environments.

2. Background Information

A laser is a device that converts input power into a very narrow, intense beam of coherent energy at a single frequency, generally, but not necessarily, within the visible to infrared region of the electromagnetic spectrum. Lasers may operate either continuously or in a pulsed mode. High power lasers generally operate in a pulsed mode due to input power requirements, cooling problems, and other considerations. The pulse width of the output of a pulsed laser is typically on the order of nanoseconds or picoseconds. Lasers are well known in today's technological environment and are useful in numerous and diverse applications.

The ability to detect laser energy is desirable in various environments. Known laser detection systems are non-portable, expensive, complex and require accurate or pre-determined alignment or positioning within the path of a laser beam in order to function properly. These systems are therefore impractical for use by personnel on airborne and ground-based platforms or in the field.

It is, therefore, desirable to provide an apparatus that is completely self-contained in a compact, light-weight, and portable configuration for detecting pulsed-laser energy in various environments.

SUMMARY OF THE INVENTION

The disclosed invention overcomes the disadvantages of the prior art by providing a portable apparatus for detecting pulsed-laser energy which is designed to accompany personnel on airborne and ground-based platforms and in the field. The portable laser detection device of the present invention generates visual and audible warnings upon the detection of laser energy having certain characteristics. It is desirable, in certain environments, to detect laser signals based on the particular laser's characteristic wavelength and pulse width. Laser signal detection is accomplished upon sensing energy within a predetermined spectral region that rises above a certain minimum threshold energy level and then falls below that energy level before the expiration of a predetermined time interval. A delay circuit is included to prevent signal detection from being thwarted if a signal having a pulse width greater than the predetermined time interval is received immediately after a signal having a pulse width less than the predetermined time interval is received. Alternatively, high-energy pulse detection is accomplished upon sensing an energy pulse having a sufficiently fast rise time and a minimum energy density.

The detection device collects optical signal energy through a diffuse transmissive plate that is coupled to a fiberoptic element. Collected optical energy is directed via the fiberoptic element onto a detector that is located within the main body of the sensor module. The sensor module is shielded against the effects of electromagnetic interference (EMI).

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1B:
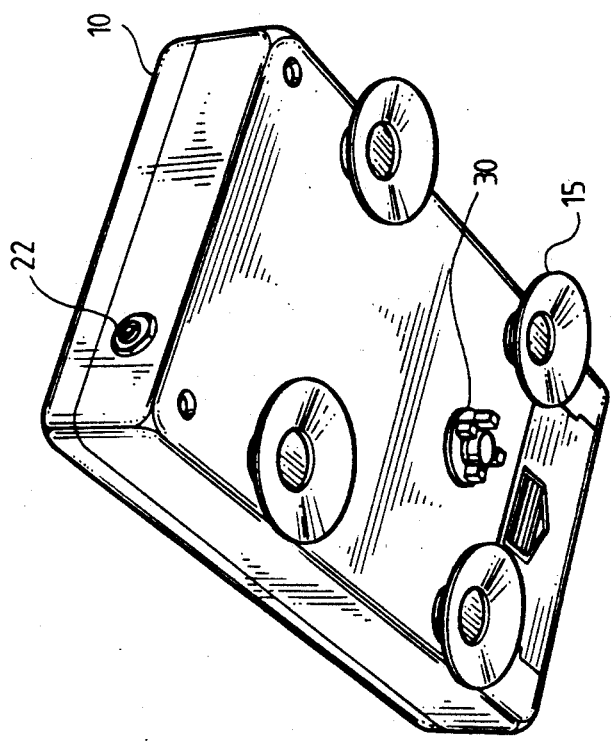
FIGS. 1A-B are top and bottom perspective views illustrating the external features of a portable laser detection device with a fiber optic sensor constructed in accordance with an embodiment of the present invention.
Figure 1A:
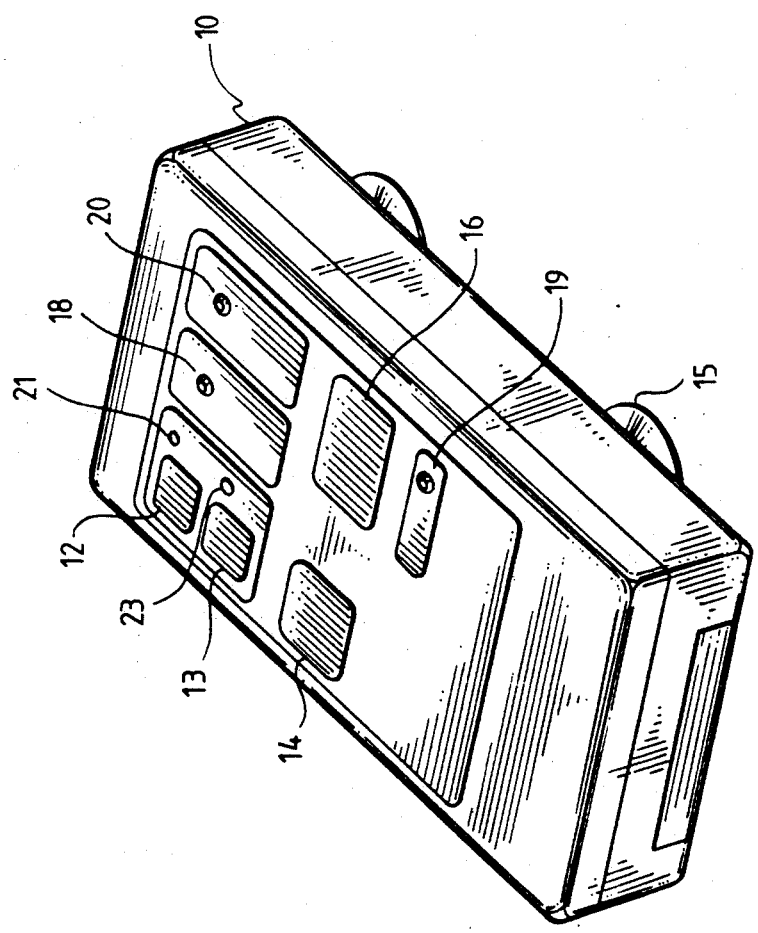

Referring to FIGS. 1A-B, perspective views of the external features of a laser detector of the present invention are shown. A case 10 contains controls which may be in the form of a power on button 12, a power-off button 13, a test button 14, and a reset button 16. The device case 10 also includes a laser present indicator 18, a low battery indicator 19, a laser occurred indicator 20, a power on indicator 21, an earphone jack 22, and a speaker 23. The device case 10 also has an optical housing 30 which contains an optical input device for receiving optical pulses. The device case 10 may be provided with suction cups 15 for mounting the device on a suitable surface. The device case 10 may be shielded from the effects of electromagnetic interference (EMI) by an interior and exterior plating of a thin conductive metal coating. According to a preferred embodiment of the present invention, the laser detector device measures approximately 5.125"×3.125"×1", and weighs approximately 8 ounces.

Figure 2:
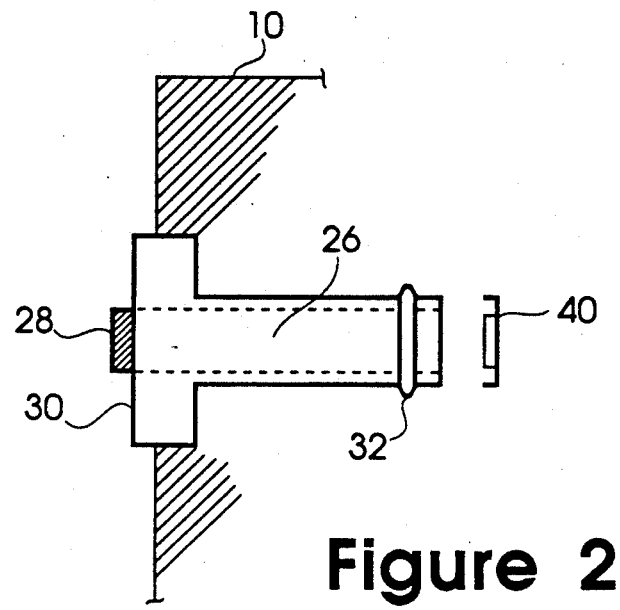
FIG. 2 is a diagram of an optical input device useful with an embodiment of the present invention.
Figure 3:
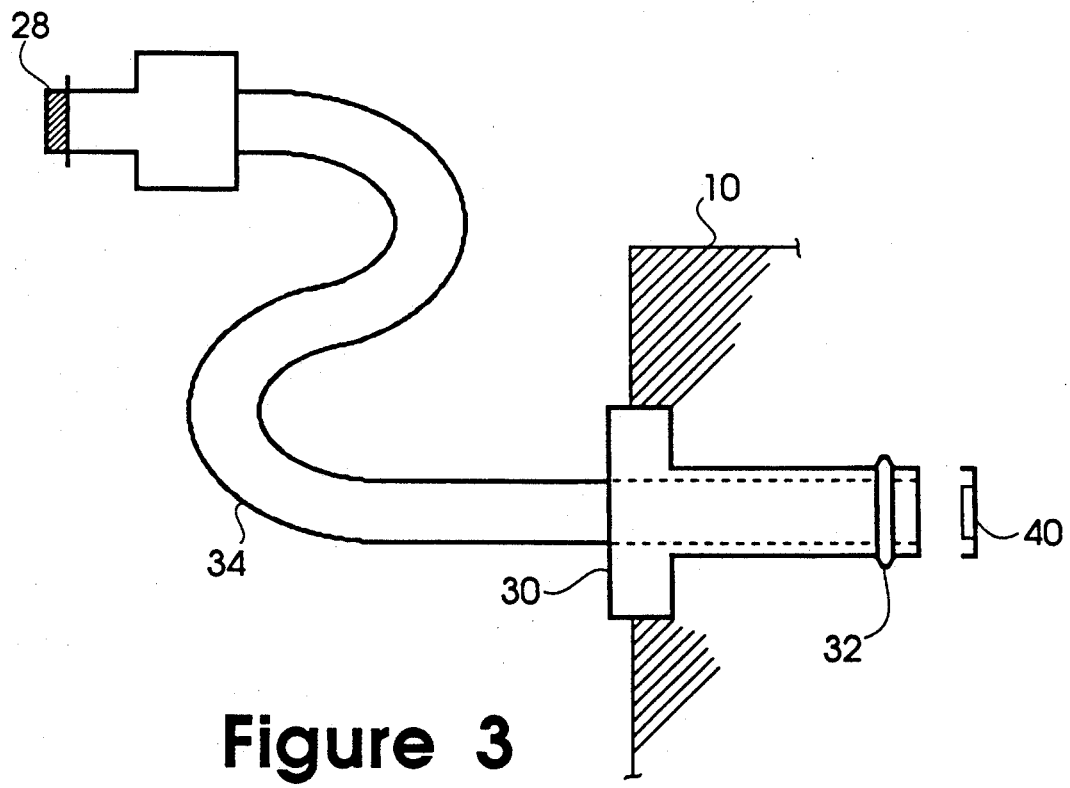
FIG. 3 is a diagram of an alternative optical input device useful with an embodiment of the present invention.

Referring now to FIG. 2, a diagram of an optical input device within the optical housing 30 is shown. A fiber optic stud 26 inside the device case 10 terminates at a diffuse optic input 28. The stud 26 may be a solid glass stud or a short section of a fiber optic bundle. The stud 26 and diffuse optic input 28 are contained by the housing 30. The housing 30 may extend beyond the surface of the device case 10. An O-ring seal 32 seals the stud 26 within the housing 30. FIG. 3 shows an alternative optical input in which the stud 26 is replaced by a flexible fiber optic bundle 34. The bundle 34 may, for example, be thirty-inches long and allows for multi-directional remote sensing of laser pulses.

The diffuse optic input 28 may be a diffuse transmissive plate of a type well known to those skilled in the art of optics. The diffuse optic input 28 increases the field-of-view of the laser detector to 140 degrees or more as opposed to 60 degrees or less for the fiber optic stud 26 by itself. The fiber optic stud 26 is used to direct the collected signal energy onto a detector 40 which, in the preferred embodiment, is a photodiode within the device case 10. The diffuse optic element 28 may be coupled directly to the end of the fiber optic element 26 or may be separated from the fiber optic element 26 by a short distance.

Figure 4:
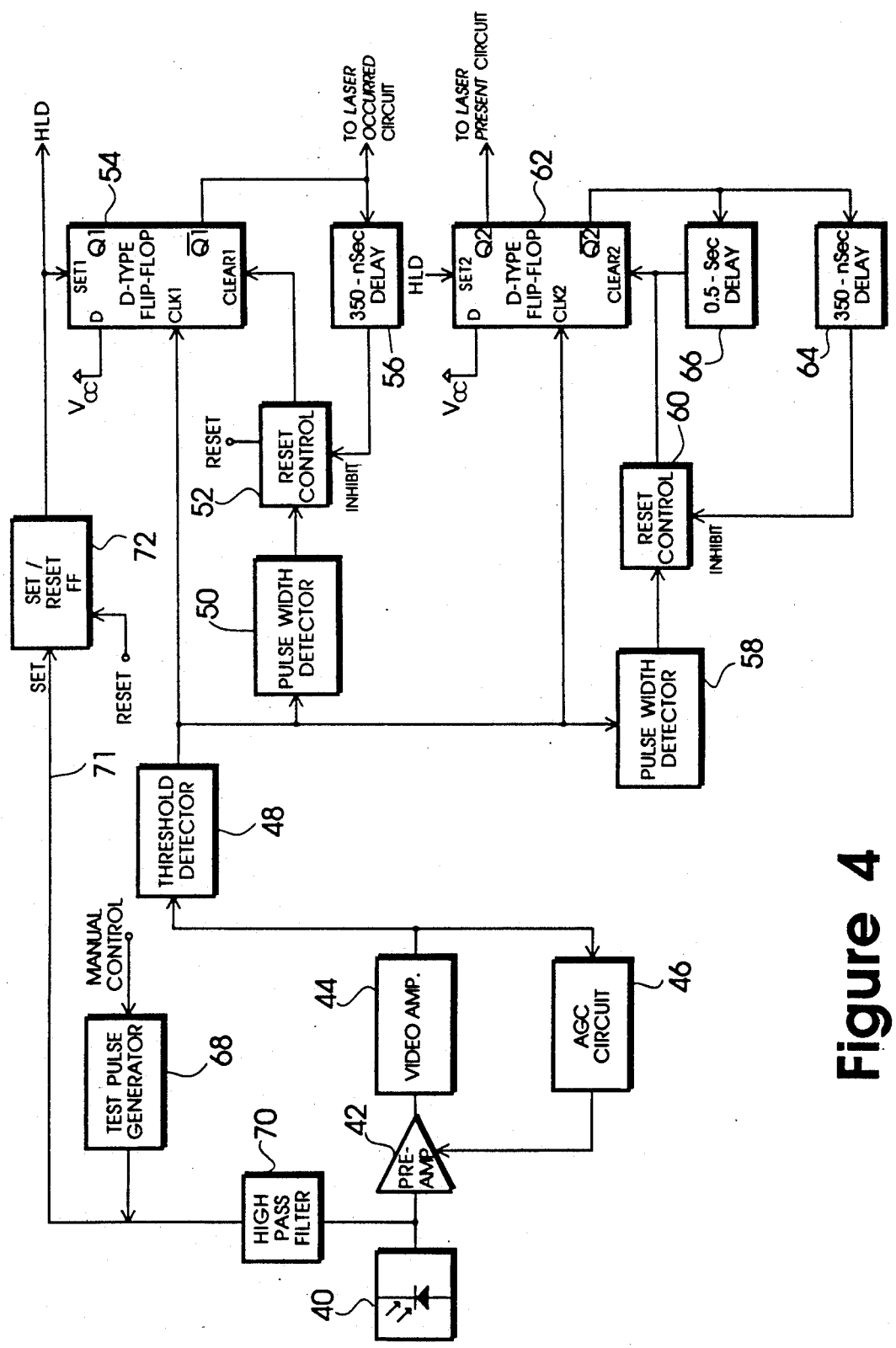
FIG. 4 is a general block diagram of the portable laser detection device in accordance with a preferred embodiment of the present invention.

Referring now to FIG. 4, a block diagram of a preferred embodiment of the present invention is shown. Optical energy is received by photodiode 40 by way of the diffuse optic input 28 and transmissive element 26 or 34. The output of photodiode 40 is connected to a preamp 42, which in turn feeds a video amplifier 44. The output of the video amplifier 44 is fed back into the preamp 42 by way of an automatic gain control circuit 46. The output of the video amplifier 44 also serves as the input to a threshold detector 48. The output of the threshold detector 48 is fed into clock inputs CLK1 and CLK2 of D-type flip-flops 54 and 62 and into pulse width detectors 50 and 58. The outputs of pulse width detectors 50 and 58 are fed into CLEAR1 and CLEAR2 inputs of flip-flops 54 and 62 respectively by way of reset control circuits 52 and 60 respectively.

Figure 6:
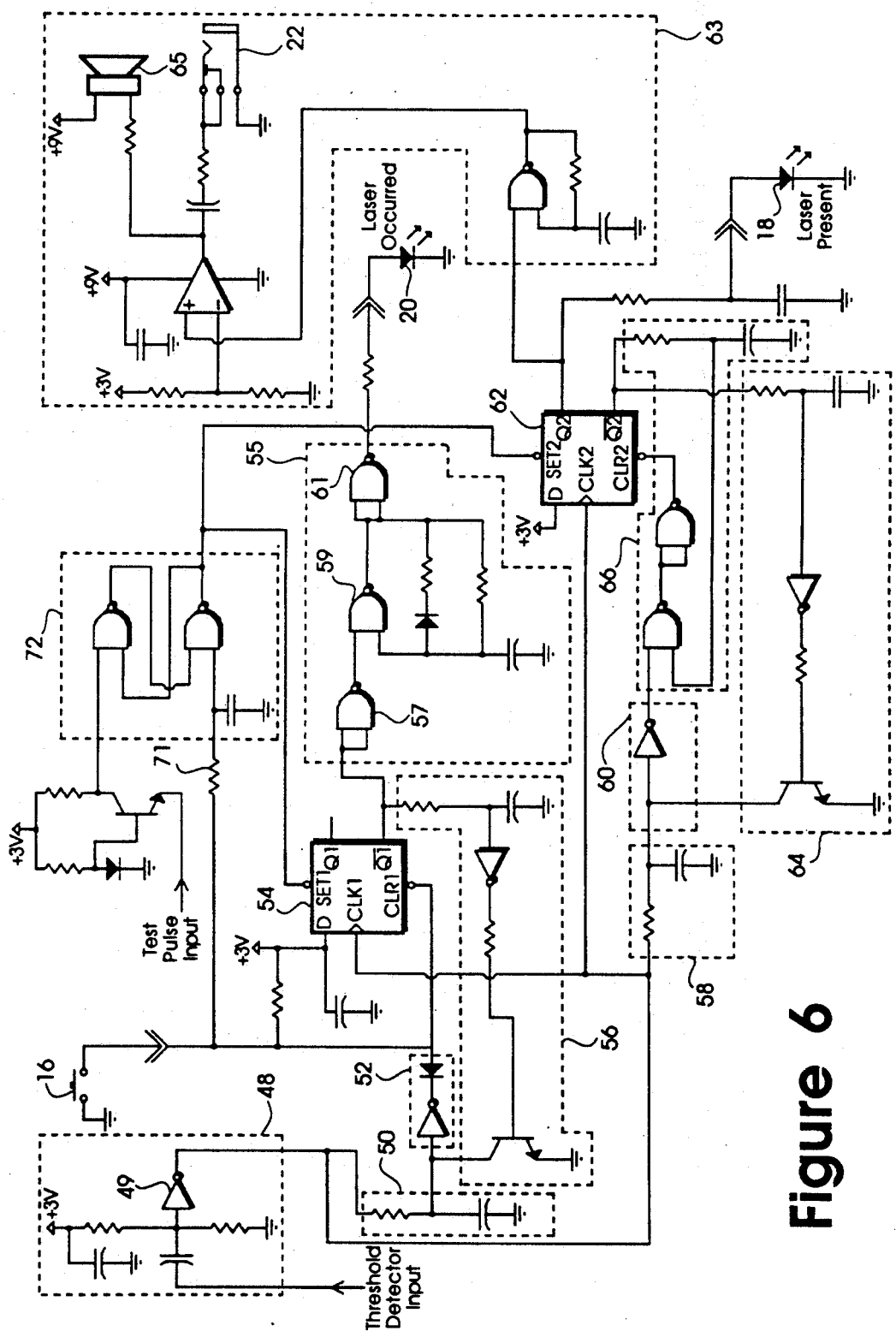
FIG. 6 is a schematic circuit diagram of the pulse detection and indicator sections of the device of FIG. 4.

Outputs $\overline{Q}1$ and $\overline{Q}2$ of flip-flops 54 and 62 are fed back into reset control circuits 52 and 60 by way of delay circuits 56 and 64 respectively. In addition, the $\overline{Q}2$ output of flip-flop memory 62 is fed back into its own CLEAR2 input by way of a half-second delay circuit 66. Finally, output $\overline{Q}1$ of flip-flop 54 and an output Q2 of flip-flop 62 are connected to a laser occurred circuit 55 (FIG. 6) and a laser present circuit 63 respectively (FIG. 6).

The laser detector also includes a High Level Detect (HLD) circuit which is fed by a second circuit path from the output of the photodiode 40. The HLD circuit includes a high pass filter 70 with its output connected to a set input 71 of a set/reset flip-flop 72. The output of the set/reset flip-flop 72 is fed into inputs SET1 and SET2 of the flip-flops 54 and 62.

The laser detector also includes a built-in test circuit including a built-in test pulse generator 68 which operates responsive to the test button 14.

As an additional measure to further reduce the potential susceptibility to EMI effects, the detector and amplifier circuitry may be enclosed in copper (Cu) shielding prior to mounting within the EMI-shielded device case 10.

Figure 5:
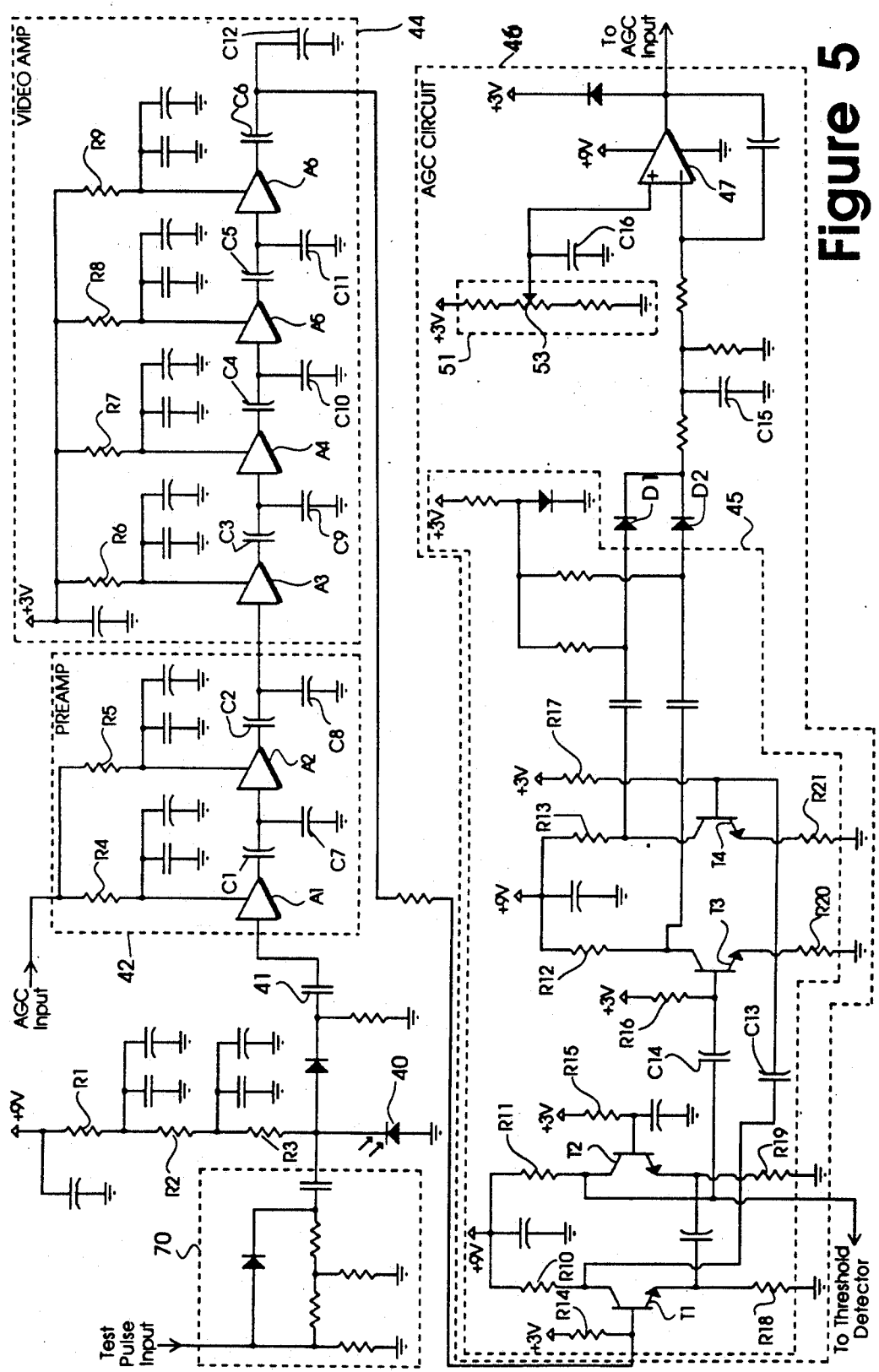
FIG. 5 is a schematic circuit diagram of the photodiode, amplification, and gain control sections of the device of FIG. 4.

Referring now to FIG. 5, a schematic circuit diagram of the photodiode 40, the preamp 42, the video amp 44, the AGC circuit 46, and the high pass filter 70 is shown. A nine volt positive voltage is supplied to photodiode 40 by way of resistors R1, R2, and R3.

The photodiode 40 may be a silicon PIN diode or an avalanche photo diode which is capable of detecting pulsed optical signals having wavelengths approximately within the 0.4 to 1.1 micron spectral region. Alternatively, detection of pulsed optical signals having wavelengths approximately within the 1.0 to 3.0 micron region can be provided by replacing the silicon PIN diode 40 with a germanium diode. It will be appreciated by those of skill in the art that many other types of detection means may be implemented in the present invention to achieve detection of pulsed optical signals within various ranges of wavelengths.

A pulsed optical signal is received by the photodiode 40, which in turn generates a pulse of electric current. The magnitude of the electrical pulse is proportional to the strength (or power density) of the laser pulse. The electrical pulse is supplied to the preamp 42 by way of a capacitor 41. The capacitor 41 serves to block any DC component generated by the photodiode 40 as a result of ambient background radiation. The electrical pulse is then further amplified by the video amplifier 44 and fed into the AGC circuit 46 and also into the threshold detector 48.

In a preferred embodiment of the present invention, the preamp 42 may be a microwave monolithic integrated circuit based on silicon technology. For example, the preamp 42 may include a series A1, A2, A3, A4, A5, and A6 of UPC 1675G microwave amplifiers manufactured by NEC Corporation. A series of capacitors C1, C2, C3, C4, C5, and C6 may be used to connect the amplifiers A1-A6 respectively. Further, the outputs of each amplifier A1-A6 may be stored by capacitors C7, C8, C9, C10, C11, and C12. Power is supplied to amplifiers A1 and A2 of the preamp 42 from the AGC circuit, described below, by way of resistors R4 and R5 respectively. A three volt positive voltage is supplied to amplifiers A3-A6 by way of resistors R6, R7, R8, and R9. The preamp 42 is capable of amplifying the current pulse by 20 dB. The video amp 44 is capable of amplifying the frequency components of the current pulse which range between 20 KHz and 40 MHz by approximately 60 dB.

The AGC Circuit 46 includes a full-wave rectifier 45 which includes NPN transistors T1, T2, T3, and T4. The collectors of transistors T1-T4 are connected to a nine volt positive voltage by way of resistors R10, R11, R12, and R13 respectively. The bases of transistors T1-T4 are connected to a three volt positive voltage by way of resistors R14, R15, R16, and R17 respectively. The emitters of transistors T1-T4 are connected to ground via grounding resistors R18, R19, R20, and R21. The collector of transistor T1 is connected to the base of transistor T4 by way of capacitor C13, and the collector of transistor T2 is connected to the base of transistor T3 by way of capacitor C14. The collector of transistor T2 provides the output to the threshold detector 48. The full-wave rectifier 45 outputs the average value of the video amplifier noise, by way of diodes D1 and D2, to a storage capacitor C15. This average value of the video amplifier noise is supplied to the inverting input of an operational amplifier 47. The non-inverting input of the operational amplifier 47 receives input from a voltage divider 51 which includes a potentiometer 53. The voltage divider stores a voltage on a storage capacitor C16. The output of the operational amplifier 47 is fed back into the preamp 42 to adjust its gain.

The AGC circuit 46 thus measures the average value of the noise at the output of the video amplifier 44 and adjusts the gain of the preamp 42 to adapt the laser detector to different levels of background noise. For example, the AGC circuit 46 may adjust the gain of the preamp 42 to maintain an average noise level at the output of the video amplifier 44 which is approximately one-fifth of the activation threshold voltage of the threshold detector 48. The system is thus capable of adapting to background noise variations such as photocurrent-induced shot noise, or noise generated by the photodiode 40 in response to the background radiation. Further, the AGC circuit 46 reduces the probability of false alarms due to gain variations related to temperature. Finally, the potentiometer 53 may also be adjusted to further adapt the system to various ambient conditions.

Referring now to FIG. 6, a schematic circuit diagram of the threshold detector 48, the pulse width detectors 50 and 58, the reset controls 52 and 60, the delay circuits 56, 64 and 66, the D-type flip-flops 54 and 62, and the indicator circuits 55 and 63 is shown. The threshold detector 48 includes Schmitt trigger 49 and provides a pulse to the clock inputs CLK1 and CLK2 of flip-flops 54 and 62 responsive to the video amplifier output exceeding the threshold voltage setting. The Schmitt trigger 49 may be a 74AC14 Schmitt trigger incorporating CMOS technology and which may have a threshold of about ⅔ of the supply voltage in a preferred embodiment of the present invention.

The laser detector of the present invention may detect laser signals having various pulse widths. In accordance with this preferred embodiment, the pulse width detectors 50 and 58 clear the flip-flops 54 and 62 if the pulse is longer than 175 nanoseconds. If the pulse is not longer than 175 nonoseconds, then the outputs of flip-flops 54 and 62 will be fed back into the reset control circuits 52 and 60 respectively by way of delay circuits 56 and 64 respectively. The delay circuits 56 and 64 provide a 350 nanosecond delay. The feedback into the reset control circuits will inhibit the clearing of flip-flops 54 and 62. The INHIBIT signal is the output of the delay circuits 56 and 64. The feedback into the reset control circuits 52 and 60 assures that once a pulse with a width of less than 175 nanoseconds is detected, a second pulse with a width of more than 175 nanoseconds will not clear flip-flops 54 and 62.

The $\overline{Q1}$ output of the flip-flop 54 is connected to the laser occurred circuit 55. The LASER OCCURRED circuit 55 will cause the LASER OCCURRED indicator 20 to flash at a fixed rate responsive to an output signal from flip-flop 54. NAND gates 57, 59, and 61 of the LASER OCCURRED circuit 55 will cause the laser-occurred indicator 20 to flash due to the oscillations of NAND gate 59 caused by the output of flip-flop 54. The NAND gate 59 will alternately generate a high and low output to cause the laser occurred indicator 20 to turn off and on. The NAND gates 57, 59, and 61 may be implemented using 74HC132 NAND gates available from United Technologies. As described above, the detection of a pulse with a width of less than 175 nanoseconds will pulse the clock inputs of flip-flop 54, which will provide an output signal to the LASER OCCURRED circuit 55. The laser occurred indicator 20 will flash until the user resets the system by pushing the RESET button 16.

The Q2 output of flip-flop 62 is connected to the LASER PRESENT circuit 63. Similar to the LASER OCCURRED circuit 55, the LASER PRESENT circuit 63 will cause the laser present indicator 18 to flash. The LASER PRESENT circuit 63 will also cause an audible tone to be generated from speaker 23 or through the earphone jack 22. Alternatively, the $\overline{Q2}$ output of flip-flop 62 could be used with an invert to provide an input to the LASER PRESENT Circuit 63.

The HALF-SECOND delay circuit 66 includes NAND gates 67 and 69 and clears flip-flop 62 one-half second after detection of a single laser pulse. However, if a continuous stream of pulsed optical signals is being received, the HALF-SECOND delay circuit provides an alternating high and low signal to the clear input of flip-flop 62. The NAND gates 67 and 69 may be implemented using 74HC132 NAND gates available from United Technologies. The HALF-SECOND delay circuit 66 will automatically clear flip-flop 62 every 0.5 seconds and will automatically prevent flip-flop 62 from being set for another 0.5 seconds. This allows the laser present indicator 18 and the audible tone to turn on and off at a rate that can be easily detected by the user. It will be appreciated that delays other than 0.5 seconds may be implemented in the present invention.

It will be appreciated by those of skill in the art that the photodiode 40, when receiving a pulse of very high energy, may provide an output signal with a slightly greater pulse width than the received pulse. Accordingly, the High Level Detect (HLD) circuit provides for pulse detection based on rise time and energy density as opposed to pulse width. If an optical pulse of approximately 10 watts per square centimeter or more with a rise time sufficiently fast to pass through the high-pass filter 70 (FIG. 5) is received by the photodiode 40, the set/reset flip-flop 72 (FIG. 6) will be set. This will provide a continuous input signal to the SET1 and SET2 inputs of the flip-flops 54 and 62 thus keeping flip-flops 54 and 62 set. The laser present indicator 18 will be continuously illuminated and an audible tone will be heard since flip-flop 62 will be continuously set; the HALF-SECOND delay circuit 66 will not clear flip-flop 62 in this case. The laser-occurred indicator 20 will flash at its fixed rate. This combination of indicator activity alerts the user that a single high energy pulse was received. In a preferred embodiment of the present invention, the rise time of a signal to be detected by the HLD circuit must be no more than 50 nanoseconds.

The RESET button 16 will reset the set/reset flip-flop 72 and clear flip-flop 54 by way of RESET CONTROL circuit 52. Resetting the set/reset flip-flop 72 will remove the continuous input to the preset inputs of flip-flops 54 and 62 if a pulse was detected by the HLD circuit. Clearing flip-flop 54 will turn off the laser-occurred indicator 20 which will flash continuously whether a pulse was detected by the HLD circuit or by pulse width discrimination. The laser present indicator 18 will illuminate continuously only if a pulse was detected by the HLD circuit. Thus, flip-flop 62 only needs to be reset if a pulse was detected by the HLD circuit. Reset of flip-flop 62 is accomplished by resetting the set/reset flip-flop 72. Thus, the system may be fully reset whether a pulse was detected by pulse width discrimination or by rise time discrimination (the HLD circuit).

Figure 7:
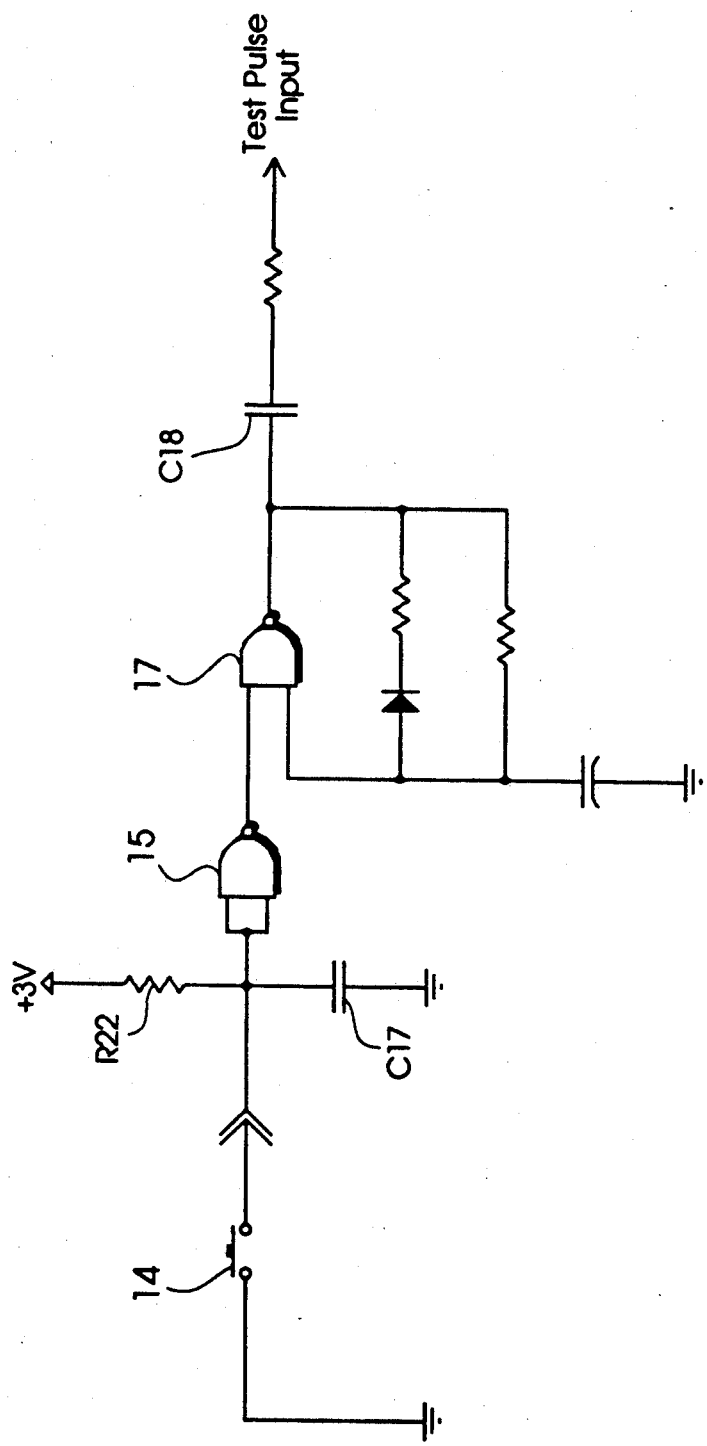
FIG. 7 is a schematic circuit diagram of a test pulse generator useful with the device of FIG. 4.

Referring now to FIG. 7, the BUILT-IN TEST pulse generator 68 is shown. The BUILT-IN TEST pulse generator 68 will generate a low level test pulse with a width of approximately 100 nanoseconds responsive to depression of the test button 14. The BUILT-IN TEST PULSE generator 68 receives power from a three volt positive voltage supply via resistor R22. A storage capacitor C17 stores a three volt charge until the test button 14 is depressed. The test pulse is generated by NAND gates 15 and 17 and is supplied to the detector input by way of capacitor C18. All components will be tested except for the photodiode 40. To test the entire system, a device capable of generating a low-level 100 nanosecond light pulses may be used.

Figure 8:
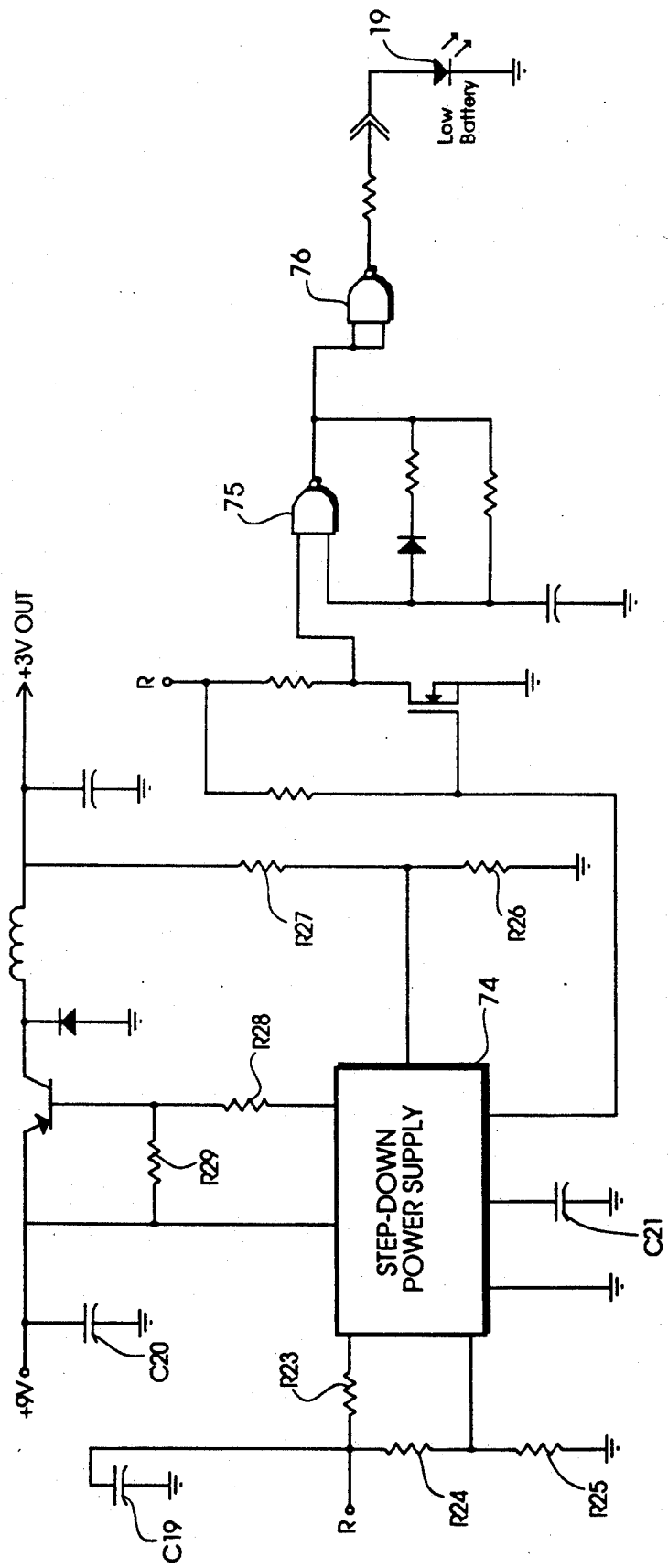
FIG. 8 is a schematic circuit diagram of a step down power supply circuit useful with the device of FIG. 4.

Referring now to FIG. 8, a schematic circuit diagram of a step-down power supply 74 is shown. The step down power supply may be used in an embodiment of the present invention to convert a nine-volt battery voltage to a three-volt supply voltage, in a manner known in the art, to properly supply power to the components of the circuit which require a three volt power supply. The step-down power supply used in this embodiment includes an RC4192N chip manufactured by Raytheon. As will be appreciated by those of skill in the art, the chip 74 may have external connections to resistors R23, R24, R25, R26, R27, R28, and R29; to capacitors C19, C20, and C21; to ground; and to additional components so as to enable the chip 74 to perform the necessary power conversion. The step-down power supply is connected to a low-battery circuit which includes NAND gates 75 and 76 and which will cause the low battery indicator 19 to illuminate when the battery power becomes too low for effective functional operation. The battery voltage may be supplied by a nine volt lithium battery (not shown) capable of providing thirty or more hours of continuous operational capability.

Figure 9:
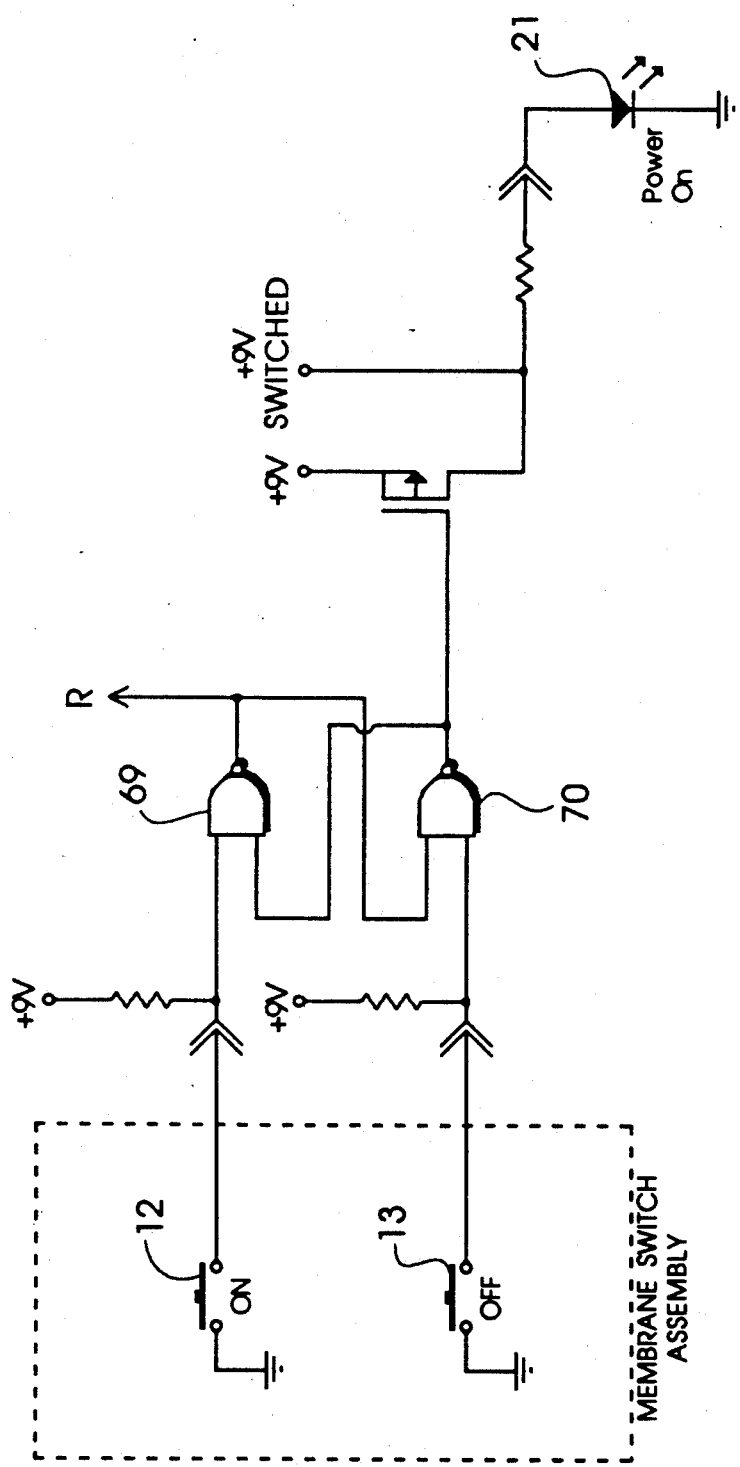
FIG. 9 is a schematic circuit diagram of the on/off power control circuitry as implemented in the device of FIG. 4.

Referring now to FIG. 9, a schematic circuit diagram of the on/off control circuitry of the present invention is shown. The power-on button 12 and the power-off button 13 may be part of a membrane switch assembly. It will be appreciated that other types of control switch assemblies may be implemented in the present invention. The on/off control circuitry includes NAND Gates 69 and 70 configured as a set-reset flip-flop. Depression of the power-on button 12 and the power-off button 13 selectively applies power to or removes power from the power-on indicator 21 and the step-down power supply.

The foregoing description of the invention has been directed to particular embodiments for purposes of explanation and illustration. It will be apparent, however, to those skilled in this art that many modifications and changes may be made without departing from the essence of the invention. The following claims are intended to cover all modifications and variations as fall within the scope of the invention.

What is claimed is:

1. A portable, hand-held detector device for detecting a pulsed laser signal, which comprises:
   (a) a case;
   (b) a conductor assembly adapted to receive an optical signal and to conduct said optical signal from the exterior to the interior of said case;
   (c) a photoelectric transducer within said case adapted to receive said optical signal from said conductor assembly and generate a first electrical signal responsive to said optical signal, said first electrical signal having a pulse width and rise time representative of the pulse width and rise time of said optical signal;
   (d) a threshold detector circuit responsive to said first electrical signal for blocking the passage of said first electrical signal unless said first electrical signal has a signal strength greater than a predetermined signal strength;
   (e) a pulse width detector circuit responsive to the output of said threshold detector circuit for generating a second electrical signal if the pulse duration of said first electrical signal is less than a predetermined value;
   (f) a delay circuit responsive to said second electrical signal for preventing said second electrical signal from being canceled if an optical signal having a pulse duration greater than said predetermined value is received shortly after said second electrical signal is generated;
   (g) a high level detect circuit responsive to said first electrical signal for generating a third electrical signal if said optical signal has a rise time less than a predetermined rise time and an energy density greater than a predetermined energy density; and
   (h) an indicator circuit responsive to said second electrical output signal for indicating the occurrence of said second electrical signal and responsive to said third electrical output signal for indicating the occurrence of said third electrical signal.

2. The apparatus of claim 1, wherein said predetermined energy density is approximately 10 watts per square centimeter and said predetermined rise time is approximately 50 nanoseconds.

3. The apparatus of claim 1 further comprising an amplifier interconnected between said photoelectric transducer and said threshold detector for amplifying said first electrical signal, and an automatic gain control circuit for automatically adjusting the gain of the amplifier responsive to variations in background noise.

4. The apparatus of claim 1 further comprising a battery for providing power to the detector device.

5. The apparatus of claim 1 wherein the photoelectric transducer is a silicon photodiode.

6. The apparatus of claim 1 wherein the photoelectric transducer is a germanium photodiode.

7. The apparatus of claim 1 further comprising electromagnetic interference shielding.

8. The apparatus of claim 1 wherein said predetermined value of the pulse duration of said first electrical signal is approximately 200 nanoseconds.

9. The apparatus of claim 1 wherein the conductor assembly includes a diffuse transmissive plate having a field of view of substantially more than approximately 60 degrees.

10. The apparatus of claim 9, wherein the conductor assembly includes a fiber optic element.

11. The apparatus of claim 10 wherein said fiber optic element is a flexible fiber optic bundle.

12. A portable, hand-held detector device for detecting a pulsed laser signal, which comprises:
   (a) a case including shielding against electromagnetic interference;
   (b) a conductor assembly adapted to receive an optical signal and to conduct said optical signal from the exterior to the interior of said case, wherein said conductor assembly includes a fiber optic element and a diffuse transmissive plate having a field of view of more than approximately 120 degrees;
   (c) a photoelectric transducer within said case adapted to receive said optical signal from said conductor assembly and generate a first electrical signal responsive to said optical signal, said first electrical signal having a pulse width and rise time representative of the pulse width and rise time of said optical signal;
   (d) a threshold detector circuit responsive to said first electrical signal for blocking the passage of said first electrical signal unless said first electrical signal has a signal strength greater than a predetermined signal strength;
   (e) a pulse width detector circuit responsive to the output of said threshold detector circuit for generating a second electrical signal if the pulse duration of said first electrical signal is less than a predetermined value;

(f) a delay circuit responsive to said second electrical signal for preventing said second electrical signal from being canceled if an optical signal having a pulse duration greater than said predetermined value is received shortly after said second electrical signal is generated;

(g) a high level detect circuit responsive to said first electrical signal for generating a third electrical signal if said optical signal has a rise time less than a predetermined rise time and an energy density greater than a predetermined energy density;

(h) an indicator circuit responsive to said second electrical output signal for indicating the occurrence of said second electrical signal and responsive to said third electrical output signal for indicating the occurrence of said third electrical signal; and (i) an amplifier interconnected between said photoelectric transducer and said threshold detector for amplifying said first electrical signal, and an automatic gain control circuit for automatically adjusting the gain of the amplifier responsive to variations in background noise.

* * * * *

UNITED STATES PATENT AND TRADEMARK OFFICE
CERTIFICATE OF CORRECTION

PATENT NO.   :   5,142,142

DATED        :   August 25, 1992

INVENTOR(S)  :   David A. Senechalle, Robert Mays, Jr., Clarence W. Fowler, Sheldon M. Rutter It is certified that error appears in the above-identified patent and that said Letters Patent is hereby corrected as shown below:

On the title page, item [73] Assignee: delete "Trator Inc."
and Insert --Tracor Aerospace, Inc.--

Signed and Sealed this

Twenty-eighth Day of September, 1993

Attest:

BRUCE LEHMAN

Attesting Officer

Commissioner of Patents and Trademarks